United States Patent
Mesh-Iliescu et al.

(10) Patent No.: US 9,386,185 B2
(45) Date of Patent: *Jul. 5, 2016

(54) ENCODING LARGE DOCUMENTS USING COLOR SPACE ENCODED IMAGE WITH COLOR CORRECTION USING A PSEUDO-EUCLIDEAN METRIC IN THE COLOR SPACE

(71) Applicant: Pictech Management Limited, Limassol (CY)

(72) Inventors: Alisa Mesh-Iliescu, Kfar Saba (IL); Vladimir Kolmanovitch, Netanya (IL)

(73) Assignee: Pictech Management Limited, Limassol (CY)

(*) Notice: Subject to any disclaimer, the term of this patent is extended or adjusted under 35 U.S.C. 154(b) by 405 days.

This patent is subject to a terminal disclaimer.

(21) Appl. No.: 13/844,184

(22) Filed: Mar. 15, 2013

(65) Prior Publication Data

US 2014/0281899 A1 Sep. 18, 2014

(51) Int. Cl.
*H04N 1/32* (2006.01)
*G06K 19/06* (2006.01)
*G06F 17/22* (2006.01)

(52) U.S. Cl.
CPC ........ *H04N 1/32106* (2013.01); *G06F 17/2205* (2013.01); *G06K 19/06037* (2013.01); *G06K 19/06075* (2013.01); *H04N 2201/325* (2013.01); *H04N 2201/3225* (2013.01); *H04N 2201/3269* (2013.01); *H04N 2201/3271* (2013.01)

(58) Field of Classification Search
CPC . G06F 17/2205; G06F 17/221; G06F 17/211; H04N 1/211; G06K 19/06037; G06K 19/06075
See application file for complete search history.

(56) References Cited

U.S. PATENT DOCUMENTS

| 5,642,137 | A | 6/1997 | Kitazumi | |
|---|---|---|---|---|
| 6,993,211 | B2 | 1/2006 | Matsui et al. | |
| 7,478,746 | B2* | 1/2009 | Cattrone | 235/10 |
| 7,751,585 | B2 | 7/2010 | Jancke | |
| 7,936,901 | B2 | 5/2011 | Jancke | |
| 7,997,491 | B2 | 8/2011 | Kuyper-Hammond et al. | |

(Continued)

OTHER PUBLICATIONS

International Search Report and Written Opinion for International Application No. PCT/IB14/01482 mailed Dec. 29, 2014. 12 pages.

(Continued)

*Primary Examiner* — Cesar Paula
*Assistant Examiner* — Konrad Kulikowski
(74) *Attorney, Agent, or Firm* — Wilmer Cutler Pickering Hale and Dorr LLP

(57) ABSTRACT

Embodiments of the present disclosure can include systems, methods, and non-transitory computer program products for using color space encoded images to publish an entire book including text and images onto a single piece of paper, or onto few pieces of paper. In certain aspects, the present systems and methods allow users to perform data backup using color space encoded images. In other aspects, the present systems and methods allow users to self-publish desired content significantly cheaper by encoding the desired content using color space encoded images. In certain aspects, publishers or booksellers can include traditional books in combination with digital or electronic books distributed using color space encoded images. In other aspects, the present systems and methods allow users or administrators to compress and/or copy massive documents using color space encoded images.

21 Claims, 14 Drawing Sheets

(56) References Cited

U.S. PATENT DOCUMENTS

| | | |
|---|---|---|
| 7,997,502 B2 | 8/2011 | Lv et al. |
| 8,430,329 B2 | 4/2013 | Kiuchi et al. |
| 2002/0060246 A1 | 5/2002 | Gobburu et al. |
| 2003/0058261 A1 | 3/2003 | Challa et al. |
| 2003/0072468 A1 | 4/2003 | Brunk et al. |
| 2005/0285761 A1* | 12/2005 | Jancke ............. G06K 19/06037 341/50 |
| 2006/0027662 A1 | 2/2006 | Baradi |
| 2006/0045362 A1 | 3/2006 | Ito et al. |
| 2006/0098241 A1 | 5/2006 | Cheong et al. |
| 2006/0157574 A1 | 7/2006 | Farrar et al. |
| 2006/0256114 A1 | 11/2006 | Nielsen et al. |
| 2006/0274952 A1 | 12/2006 | Nakai |
| 2007/0119940 A1 | 5/2007 | Futamura et al. |
| 2007/0153916 A1 | 7/2007 | Demircin et al. |
| 2007/0278303 A1 | 12/2007 | Cattrone |
| 2008/0137952 A1 | 6/2008 | Kokemohr |
| 2008/0298688 A1 | 12/2008 | Cheong et al. |
| 2009/0045259 A1 | 2/2009 | Ehrhart et al. |
| 2009/0310874 A1* | 12/2009 | Dixon ................... G06T 7/0044 382/233 |
| 2010/0038439 A1 | 2/2010 | Kuyper-Hammond et al. |
| 2010/0039448 A1 | 2/2010 | Kokemohr |
| 2010/0282851 A1 | 11/2010 | Bulan et al. |
| 2010/0282856 A1 | 11/2010 | Bulan et al. |
| 2010/0327066 A1 | 12/2010 | Khan |
| 2011/0017826 A1 | 1/2011 | Mohan et al. |
| 2011/0049244 A1 | 3/2011 | Wang et al. |
| 2011/0058049 A1 | 3/2011 | Grindstaff et al. |
| 2012/0187193 A1 | 7/2012 | Endo |
| 2012/0269427 A1 | 10/2012 | Simske et al. |
| 2012/0301022 A1 | 11/2012 | Yang et al. |
| 2012/0311320 A1 | 12/2012 | Brown et al. |
| 2013/0092738 A1 | 4/2013 | Blasinski et al. |
| 2013/0161395 A1 | 6/2013 | Tian et al. |
| 2013/0161396 A1 | 6/2013 | Ming et al. |

OTHER PUBLICATIONS

International Search Report and Written Opinion for International Application No. PCT/IB14/01468 mailed Jan. 15, 2015. 9 pages.

\* cited by examiner

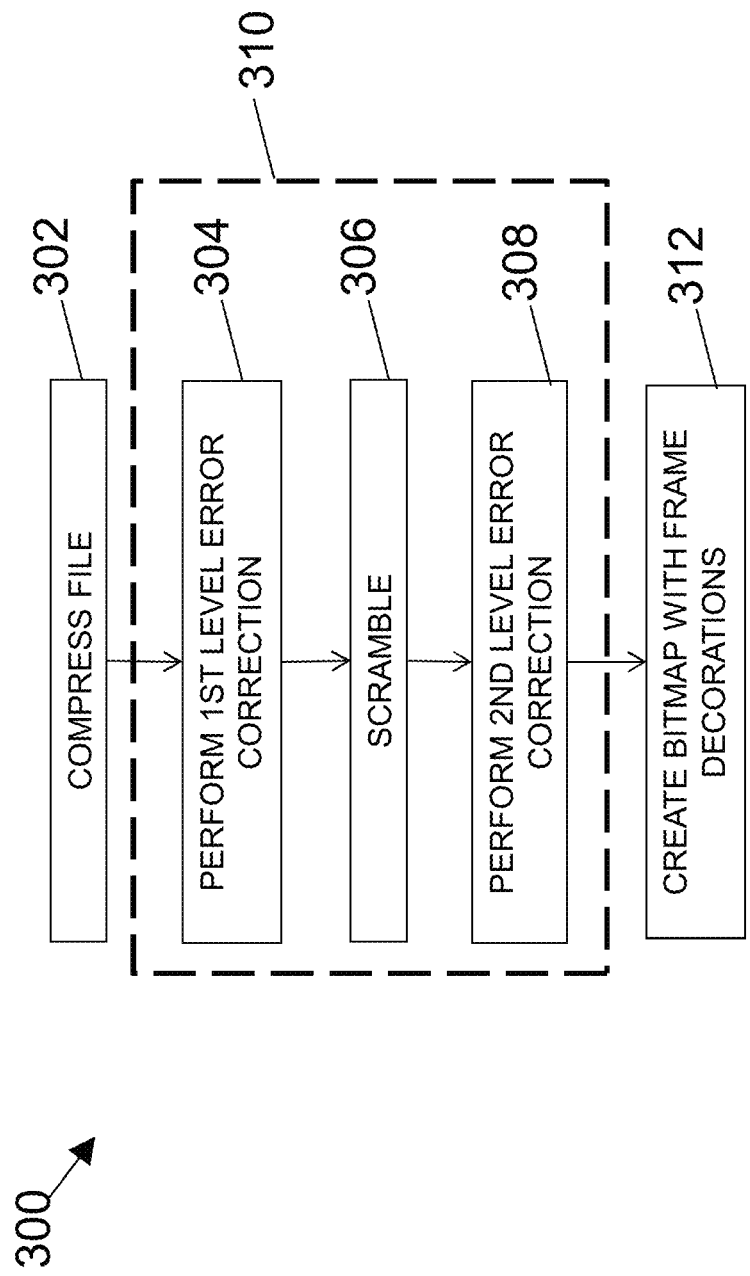

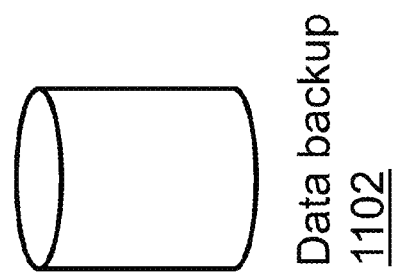
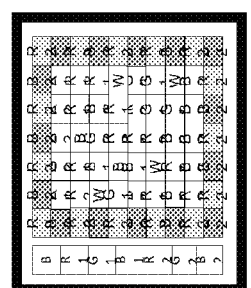
Data backup
1102
102
FIG. 11

ENCODING LARGE DOCUMENTS USING COLOR SPACE ENCODED IMAGE WITH COLOR CORRECTION USING A PSEUDO-EUCLIDEAN METRIC IN THE COLOR SPACE

CROSS-REFERENCE TO RELATED APPLICATIONS

U.S. patent application Ser. No. 13/836,447, filed concurrently herewith and entitled "Data Storage and Exchange Device For Color Space Encoded Images;"

U.S. Pat. No. 9,027,842, filed concurrently herewith and entitled "Broadcasting Independent of Network Availability Using Color Space Encoded Image;"

U.S. patent application Ser. No. 13/837,155, filed concurrently herewith and entitled "Image Encoding and Decoding Using Color Space;"

U.S. patent application Ser. No. 13/837,895, filed concurrently herewith and entitled "Color Restoration for Color Space Encoded Image;"

U.S. Pat. No. 9,042,663, filed concurrently herewith and entitled "Two-Level Error Correcting Codes for Color Space Encoded Image;"

U.S. Pat. No. 9,014,473, filed concurrently herewith and entitled "Frame of Color Space Encoded Image for Distortion Correction;"

U.S. Pat. No. 8,973,844, filed concurrently herewith and entitled "Information Exchange Using Photo Camera as Display for Color Space Encoded Image;"

U.S. Pat. No. 9,027,843, filed concurrently herewith and entitled "Information Exchange Display Using Color Space Encoded Image;"

U.S. patent application Ser. No. 13/841,338, filed concurrently herewith and entitled "Information Exchange Using Color Space Encoded Image;"

U.S. patent application Ser. No. 13/844,207, filed concurrently herewith and entitled "Combination Book With E-Book Using Color Space Encoded Image;"

U.S. patent application Ser. No. 13/837,769, filed concurrently herewith and entitled "Image Fragmentation for Distortion Correction of Color Space Encoded Image;"

U.S. patent application Ser. No. 13/844,000, filed concurrently herewith and entitled "Book Using Color Space Encoded Image;"

U.S. patent application Ser. No. 13/844,127, filed concurrently herewith and entitled "Data Backup Using Color Space Encoded Image;"

U.S. patent application Ser. No. 13/844,168, filed concurrently herewith and entitled "Self-Publication Using Color Space Encoded Image;" and U.S. patent application Ser. No. 13/840,504, filed concurrently herewith and entitled "Information Broadcast Using Color Space Encoded Image."

FIELD OF THE DISCLOSURE

The present disclosure relates to applications of and exchange devices for color space encoded images, and methods of encoding and decoding color space encoded images. More particularly, the present disclosure relates to encoding and decoding of machine-based data using high capacity multi-colored composite two-dimensional pictures having different symbols organized in specific order and sets in a color space.

BACKGROUND

With smartphones and tablets having become widely deployed as well as 3G and Wi-Fi based access to Internet, data capture technologies work as an interface between databases and user devices. Example data capture technologies include bar codes, QR codes, Radio Frequency Identification (RFID) and Near Field Communication (NFC). Most of these technologies are used as either a visible or an invisible tag to connect these databases and user devices. The introduction of cloud storage adds extended use of data exchange between data storage and end user devices.

Many households include many different devices simultaneously connected to Wi-Fi access points. This ubiquitous Wi-Fi usage increases electromagnetic fields around the home environment. Despite the usefulness of Wi-Fi, long term consequences for the human body and general health are not clear.

End user devices such as smartphones and tablets are frequently equipped with photo and/or video cameras. These cameras can be used for capturing information presented in different visual forms. The other data capture technologies descried earlier, including bar codes and especially two dimensional (2D) bar codes such as QR codes, have attracted the attention of many researchers and companies due to the potential for inexpensive operation.

Bar codes have been used for mobile applications to deliver a multitude of different mobile services over mobile phones and other mobile communication or computing devices. Such applications range from providing Uniform Resource Locator (URL) information to link a mobile device to the Internet, through to using a bar code as a form of e-ticket for airlines or event admissions. Hence, there is an ever growing demand for higher capacity bar codes, suited for robust application on mobile devices. Traditional approaches to higher capacity bar codes include: (i) using a colored symbol set and (ii) increasing the size of the bar code. There are known limitations for either approach, especially related to mobile devices with compromised, low resolution cameras. The traditional data capacity of 1D and 2D bar codes is severely limited. This severely limited data capacity constrains possible applications of 1D and 2D bar codes, and their primary task is simply linking camera phones to designated Web sites. Additional tasks may then be performed based on the Web site. This operation again is based on using of Wi-Fi or 3G connectivity.

The maximum data capacity of 2D bar codes has been improving over the recent years, resulting in the introduction of newer applications.

Presently, the use of color-based bar code and other symbolic encoding in color space technologies using mobile devices such as camera mobile phones has been limited by the physical size of the actual bar code symbol in relation to the information encoded within, and also by the image capturing mechanism on mobile devices to discriminate or resolve effectively a greater multitude of colors, especially under varied lighting conditions by an inexperienced, lay user. Another limiting factor has been color fidelity of hard copy output devices, such as color printers, in reproducing the true colors of such color based bar code or symbol sets in a color space.

While bar codes can be used to provide 2D encoded data, they have not been used to provide real storage devices and media.

Today, e-readers are popular and widely used with constant growth of different devices. For example, some e-readers allow users to consume content rather than create content. Non-limiting example e-readers can include the NOOK® e-reader from Barnes & Noble, Inc., in New York, United States of America, and the KINDLE® e-reader from Amazon, Inc. The number of people reading books and magazines on such e-reader devices is also growing very fast. Still, most new books for e-readers are acquired online over the Internet, for example through connections such as a cellular network including 3G or 4G Long Term Evolution (LTE), or a wireless network including Wi-Fi, ultimately downloading content directly to an e-reader device. If needed, a copy of the book can be stored online, or "in the cloud."

This traditional distribution model for e-readers requires content such as a book or video to be delivered, downloaded, and stored in electronic form. If an e-reader needs to perform additional downloading, for example to retrieve additional chapters of a book or video, again the cellular or wireless network is used. As described earlier, a side effect of radio-based technologies such as cellular or wireless network includes immersing users in electromagnetic (EM) fields, health effects of which can be uncertain.

On the other hand, traditional books are becoming less popular due to their size and corresponding storage requirements. Sometimes the cost of traditional book and delivery costs can also be higher than for e-books. However, a benefit of traditional books includes durability. For example, some public and private libraries can contain traditional books as old as a few hundred years. It remains uncertain whether electronic storage devices can be as stable and durable as traditional paper and traditional books over the years. Compact discs (CDs), flash memory, and hard disk drives (HDD) all have limited time before major failure. Similarly, external storage devices are not guaranteed against catastrophic failure or damage.

Traditional book printing has related problems. Traditional paper production is expensive. Furthermore, serious ecological problems can arise, related to use of wood as a source for the paper production industry. Finally these problems can also be reflected in the cost of a traditional book, if traditional publishers and booksellers push these related costs on to consumers. Cost can also be a factor. For example, self-publishing has become popular in the United States. The cost of publishing traditional books makes self-publishing almost prohibitive. For example, publishing houses may not be willing to deal with small quantities of book printing when the risk of losing money can be relatively higher than with larger publishing runs.

SUMMARY

Embodiments of the present disclosure can include systems, methods, and non-transitory computer program products for using color space encoded images to publish an entire book including text and images onto a single piece of paper, or onto few pieces of paper. In certain aspects, the present systems and methods allow users to perform data backup using color space encoded images. In other aspects, the present systems and methods allow users to self-publish desired content significantly cheaper by encoding the desired content using color space encoded images. In certain aspects, publishers or booksellers can include traditional books in combination with digital or electronic books distributed using color space encoded images. In other aspects, the present systems and methods allow users or administrators to compress and/or copy massive documents using color space encoded images.

In accordance with the disclosed subject matter, methods, systems, and non-transitory computer program products are provided for encoding documents.

Certain embodiments include methods for encoding documents. A method includes receiving one or more documents and creating colored cells within a color space to provide an encoded representation of the received one or more documents in an image by processing the received documents to obtain a stream of integers. Each integer in the stream of integers corresponds to a color in the color space for a cell in the image. The method also includes creating one or more additional cells adjoining the image, the one or more additional cells for assisting in decoding the encoded image.

Certain embodiments include systems for encoding documents. A system includes at least one processor configured to receive one or more documents and create colored cells within a color space to provide an encoded representation of the received one or more documents in an image by processing the received documents to obtain a stream of integers. Each integer in the stream of integers corresponds to a color in the color space for a cell in the image. The at least one processor are further configured to create one or more additional cells adjoining the image, the one or more additional cells for assisting in decoding the encoded image.

Certain embodiments include non-transitory computer program products for encoding documents. A non-transitory computer program product can be tangibly embodied in a computer-readable medium. The non-transitory computer program product include instructions operable to cause a data processing apparatus to receive one or more documents and create colored cells within a color space to provide an encoded representation of the received one or more documents in an image by processing the received documents to obtain a stream of integers. Each integer in the stream of integers corresponds to a color in the color space for a cell in the image. The instructions are operable to further cause the data processing apparatus to create one or more additional cells adjoining the image, the one or more additional cells for assisting in decoding the encoded image.

The embodiments described herein can include additional aspects of the present invention. For example, the method can also include comprising printing the image onto a medium. The at least one processor can be further configured to print the image onto a medium. The instructions are operable to further cause the data processing apparatus to print the image onto a medium. The medium can include at least one of paper and plastic. The method can further include storing the image electronically. The at least one processor can be further configured to store the image electronically. The instructions are operable to further cause the data processing apparatus to store the image electronically. The document can include a plurality of pages of content.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

FIG. 3 illustrates a method that the system performs for encoding an image in accordance with certain embodiments of the present disclosure.

FIG. 11 illustrates a block diagram of an example system for data backup for e-books and other content using color space encoded images in accordance with certain embodiments of the present invention.

DETAILED DESCRIPTION

The present systems and methods allow for use of 2D color-space codes to encode images with greater data capacity. The 2D color-space encoded images described herein can provide a wide variety of applications, regardless of network connectivity. The present systems and methods allow a sufficient amount of data or even an entire database to be encoded and placed in a storage device using the 2D images encoded and organized by color-space codes as described herein.

The present disclosure has utility in, for example, data back-up storage applications or data exchange using mobile devices to provide color two-dimensional pictures for processing.

Figure 1:
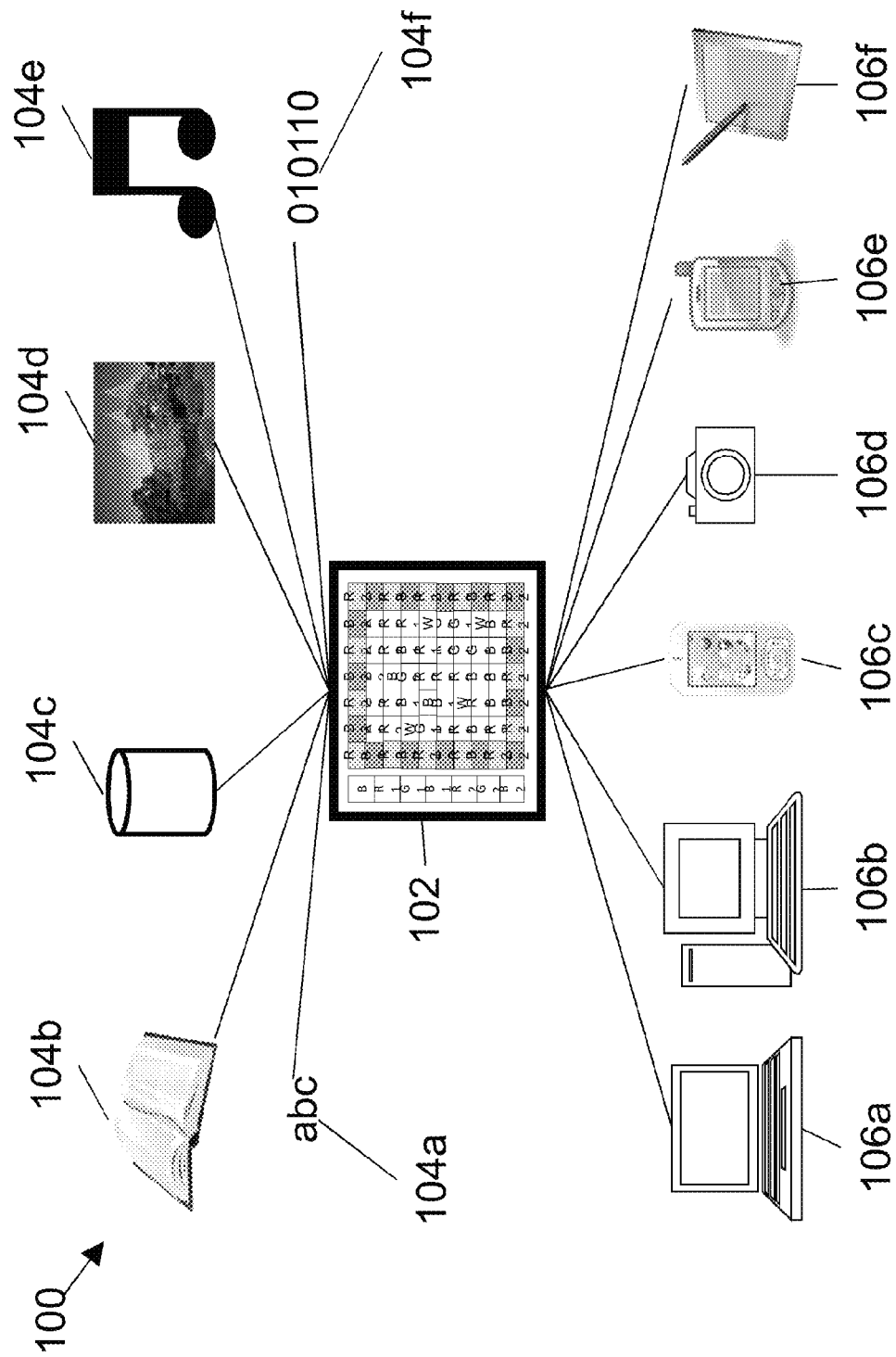
FIG. 1 illustrates a system for storing, encoding, and decoding a 2D color space image in accordance with certain embodiments of the present disclosure.

FIG. 1 illustrates a system 100 for storing, encoding, and decoding a 2D color space image in accordance with certain embodiments of the present disclosure. System 100 includes a 2D color space image 102. System 100 can encode any type of desired machine-based data. Non-limiting examples of machine-based data include text 104a, books 104b (containing, for example, text and images), databases 104c, photographs 104d or other artwork, images, video, film, or movies, music 104e, or any other type of binary data 104f.

In some embodiments, capturing of desired data can be done using a conventional camera or scanner, or a smartphone or tablet camera.

For example, a user can encode selected information into a 2D color-space coded image and print the image on any desired media (e.g., paper, textile, plastic, etc.). The 2D color-space coded image can also be depicted on any display, including posters, TV screens or computer monitors, as well as displayed on mobile devices such as smartphones or tablets. Digital photo cameras can be used as display devices as well.

Using a capturing device (e.g., a conventional camera or scanner or a smartphone or tablet camera) with an external PC or internal processor having image reading or decoding software, the image code can be decoded and the encoded data can be read. The present systems and methods allow information to be retrieved, decoded, and saved in the memory of a device or presented on a display for further use. For example, the decoded data can be read on a laptop computer 106a or a desktop computer 106b, a smart phone 106c, a photo camera 106d, a palmtop or handheld device 106e, or a tablet 106f. All this can be done without manual work. No network connectivity or additional cost is required.

High Volume Data Storage and Exchange Device and Encoding/Decoding Methods

The present systems and methods relate to a data storage device for storing 2D color space encoded images, methods of encoding and decoding the 2D color space encoded images, and application of the 2D color space encoded images to data exchange.

More particularly, the present disclosure relates to encoding, transmission, and decoding of machine-based data using an appropriately formatted high capacity color image. The present systems and methods can be utilized, for example, for compact backup of printed materials, and/or data exchange between a color-image-displaying device and a plurality of image-reading devices.

Figure 2A:
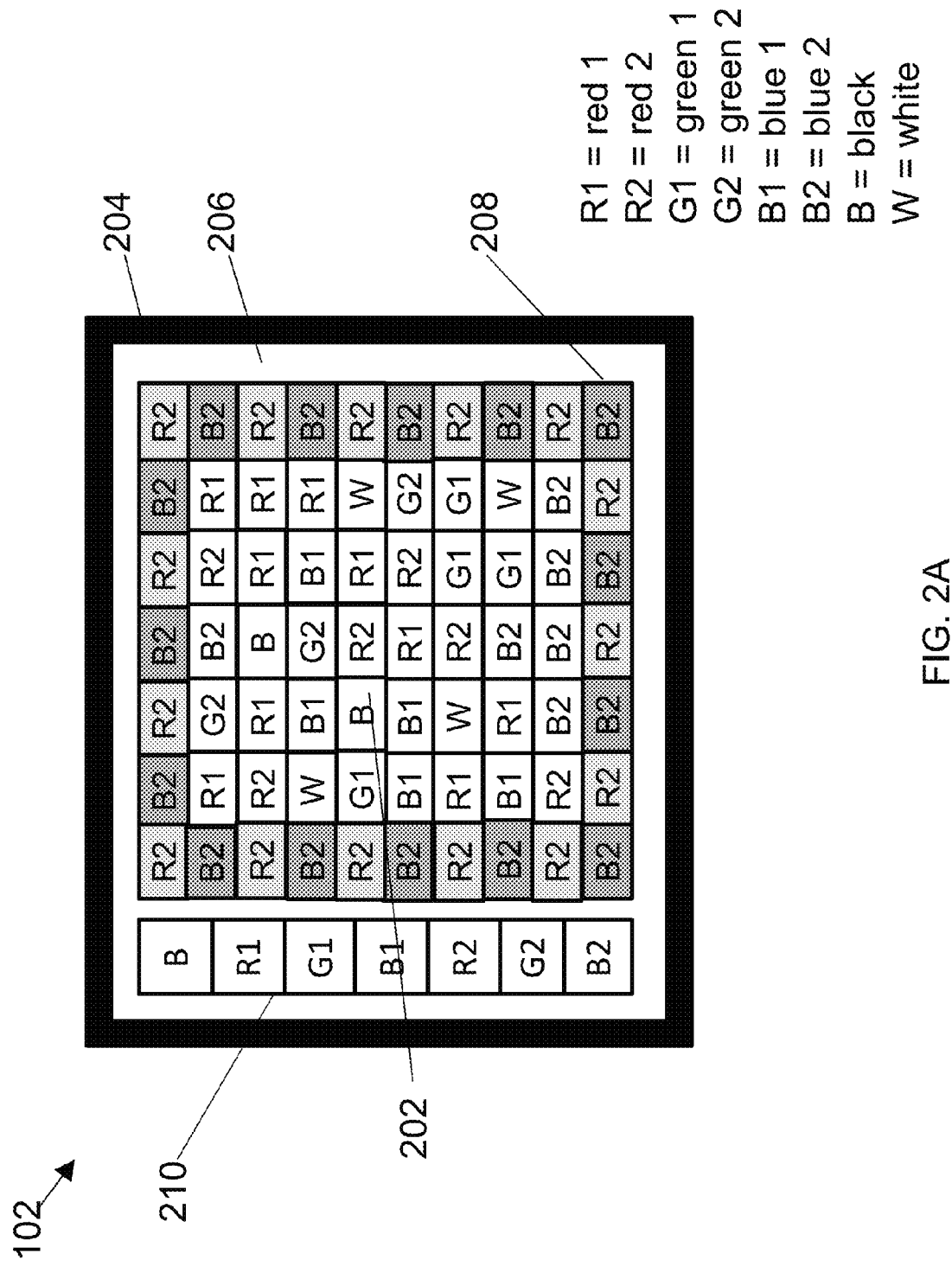
FIGS. 2A-2B illustrate the 2D color space encoded image in accordance with certain embodiments of the present disclosure.
Figure 2B:
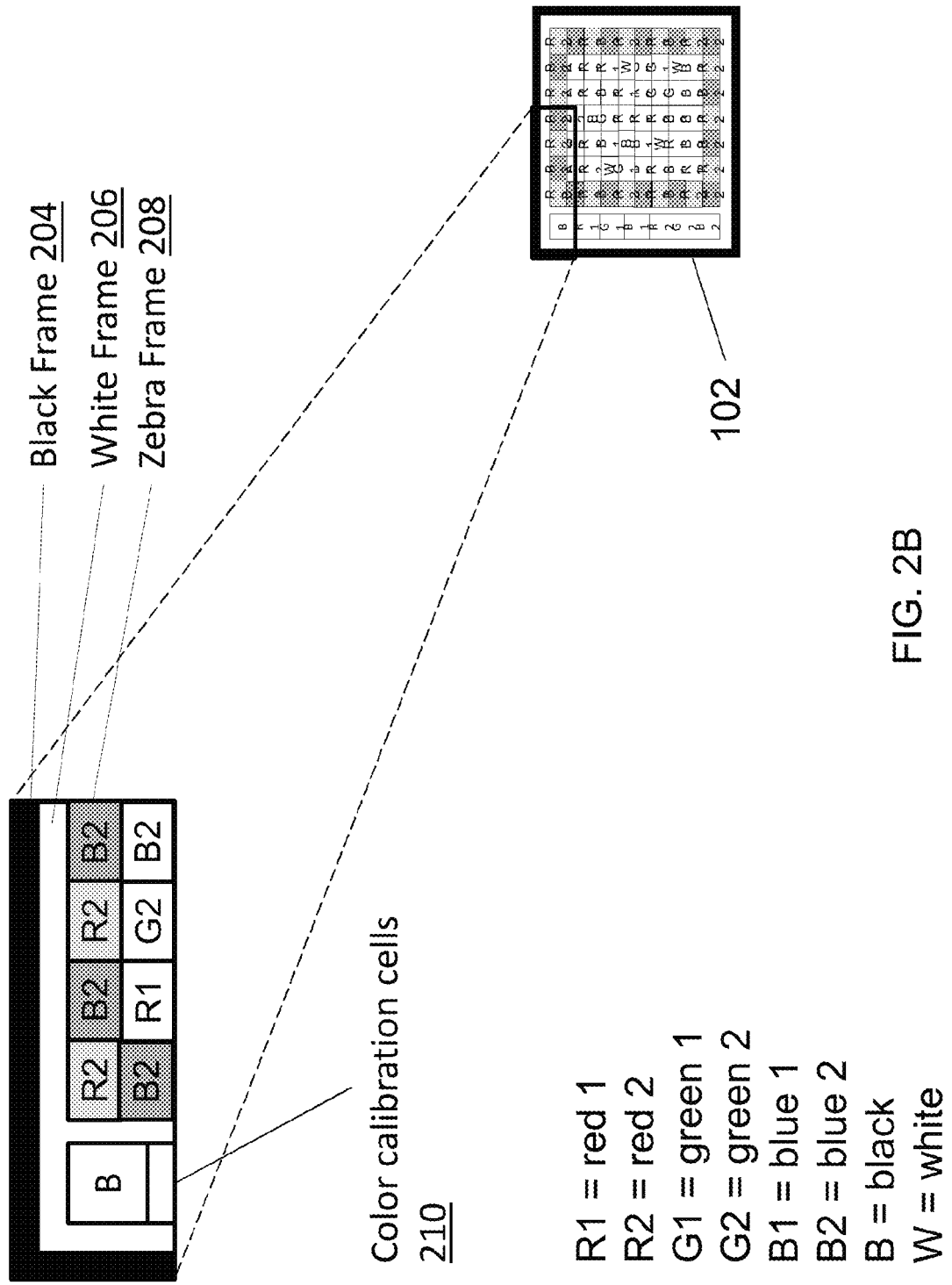

FIGS. 2A-2B illustrate the 2D color space encoded image 102 in accordance with certain embodiments of the present disclosure. As illustrated in FIG. 2A, encoded image 102 includes a number of rectangular cells 202 of different colors. In some embodiments, encoded image 102 can include a black frame 204, a white frame 206, a "zebra frame" 208 having alternating colors, and color calibration cells 210.

FIG. 2B illustrates a close-up view of the black frame 204, the white frame 206, the zebra frame 208, and the color calibration cells 210 in accordance with certain embodiments of the present disclosure. Black frame 204 and white frame 206 can be used for rough localization of the data image including rectangular cells 202, determination of geometric distortion of the data image, and estimation of cell size and scale of rectangular cells 202. Zebra frame 208 can be used for further calibration of cell size for rectangular cells 202. Color calibration cells 210 can be used for determining a number of colors $N_c$ used for encoding the data, and for indexing the colors to map the colors to numbers for encoding and decoding.

In some embodiments, rectangular cells 202 can use more than eight different colors. The number of colors can be expressed as $N_c$, for example $N_c \geq 8$. Preferably, the number of colors is selected to be a power of two.

FIG. 3 illustrates a method 300 that the system performs for encoding an image in accordance with certain embodiments of the present disclosure.

The choice of appropriate color-difference metrics can help achieve stable color resolution for image-source media and image-reading devices. Most imaging devices operating in the visible spectrum are adapted to human eye color resolution. A color space describes color capabilities of a particular device by relating numbers to actual colors. Embodiments of the present disclosure utilize metrics based on low-cost non-Euclidean distance in red green blue (RGB) color space.

In some embodiments, the present system uses color space metrics which are close to Commission International de l'eclairage (CIE) 1976 (L*,u*,v*) color space metrics. The CIELUV color space distributes colors roughly proportional to perceived color differences. In other embodiments, the present systems and methods are able to use any color space, including the CIE 1931 XYZ color space, CIELAB color space, and CIEUVW color space. Although embodiments of the present system are based on the CIELUV color space, according to experimentation, the color space used in certain embodiments is advantageously less sensitive to a color temperature of relevant image displaying media or device, and advantageously less sensitive to external illumination. Assuming R, G, and B are one byte (i.e., 0.255 or 0x0.0xFF) normalized intensity of red, green and blue color components correspondingly, a color difference $\Delta C$ between colors $C_1=(R_1, G_1, B_1)$ and $C_2=(R_2, G_2, B_2)$ can be given by the following equations:

$$\bar{r} = \frac{R_1 + R_2}{2} \quad \text{Equation (1)}$$

$$\Delta R = R_2 - R_1$$

$$\Delta G = G_2 - G_1$$

$$\Delta B = B_2 - B_1$$

$$\Delta C = \sqrt{\left(2 + \frac{\bar{r}}{256}\right)\Delta R^2 + 4\Delta G^2 + \left(2 + \frac{255 - \bar{r}}{256}\right)\Delta B^2}$$

where $\bar{r}$ describes an average red component value of $C_1$ and $C_2$.

The present system first receives machine data for encoding into an image. For example, the machine data can be contained in a file. The present system compresses the file (step 302). For example, the machine data can be compressed into a binary compressed file such as zip, rar, arc or any other archive format file.

The present system then determines an appropriate color encoding, illustrated by box 310. For example, the present system maps the resulting code sequence to a stream of integers from 0 to $N_c-1$, inclusive. Using the stream of integers, the present system creates a bitmap with frame formatting. Generation of frame formatting is described in further detail later. The present system fills the interior of the frames with color bitmap cells, encoded as described following. In some embodiments, the encoding can use error correction. A non-limiting example of error correction is the two-stage error correction described herein. In some embodiments, the encoding can use scrambling. In some embodiments, the encoding can use error correction in combination with scrambling. The present system determines the color of each cell based on the color calibration cells. The resulting encoded image can then be sent to any display, including a color printer, display, or other color image output device.

In some embodiments, the present system then performs a first level of error correction (step 304). One benefit of error correction is that the present system is able to decode an image properly, even if a portion of the image is damaged. For example, the present system can determine a header containing a cyclic redundancy check (CRC) error-detecting code, file name, format information, and sequence number (e.g., if the machine data and resulting encoded image represent only part of a larger data stream such as a video stream). In some embodiments, the present system can use any error detecting code such as repetition codes, addition of parity bits, checksums, hash functions, or more powerful error correcting codes.

In some embodiments, the present system can use a Reed-Solomon encoder of high order. A Reed-Solomon error correction code is a cyclic error-correcting code capable of detecting and correcting multiple errors in a bit stream. For example, the present system can use 8-bit words and blocks of size 255 bytes, if $N_c=16$. In further embodiments, the present system can use other error-correcting codes such as low-density parity-check (LDPC) codes or turbo codes. Reed-Solomon error correction codes are capable of detecting errors, erasures, and combinations thereof. In some embodiments, a word size for this high order level of Reed-Solomon encoding can be equal to $k*\log_2(N_c)$ rounded down, where $k>1$. As described herein, in some embodiments the two-stage error coding can perform high order Reed-Solomon encoding in a first stage, and low order Reed-Solomon encoding in a second stage. The second stage can also include smaller words. For example, the word size can be equal to $\log_2(N_c)$ bits, rounded down.

In some embodiments, the present system then scrambles the obtained code (step 306). For example, the resulting code can be interleaved using a predefined pseudorandom sequence. The present system scrambles the obtained code to spread out potential errors. Accordingly, the two-level error correction described herein can perform better. That is, when registering or capturing an image for decoding, there can be color distorgions due to non-uniform lighting, or damage on the media on which the image is printed. For example, the media can have spots, be wrinkled, and the like. The scrambling provides that "bad" color cells with uncertain data can be distributed uniformly (i.e., independently) into different encoding blocks, thereby decreasing the number of errors per block. Because error correction can have upper limits of correctable errors, the present spreading improves the effectiveness of the error correction.

In some embodiments, the present system then performs a second level of error correction (step 308). For example, the resulting scrambled code is encoded using a Reed-Solomon encoder with. For the second level of error correction, the word size can be selected to be smaller than the word size used in the first level of error correction. As described earlier, this two-stage error correction allows the present system to mark unrecoverable blocks of data during a first stage as erasures. The error correction described herein finds an index location of an error word inside a block, and also corrects the error word to its correct or true value. The two-stage error correction allows the present system to correct twice as many erasures as errors, as described in more detail later.

Registration

The present system is able to use any kind of high definition (HD) color registration device to register an encoded image. Non-limiting example registration devices can include a digital camera, a smartphone camera, a tablet camera, a video camera, a webcam, a scanner (to scan a hard copy image), etc.

Decoding

Figure 4:
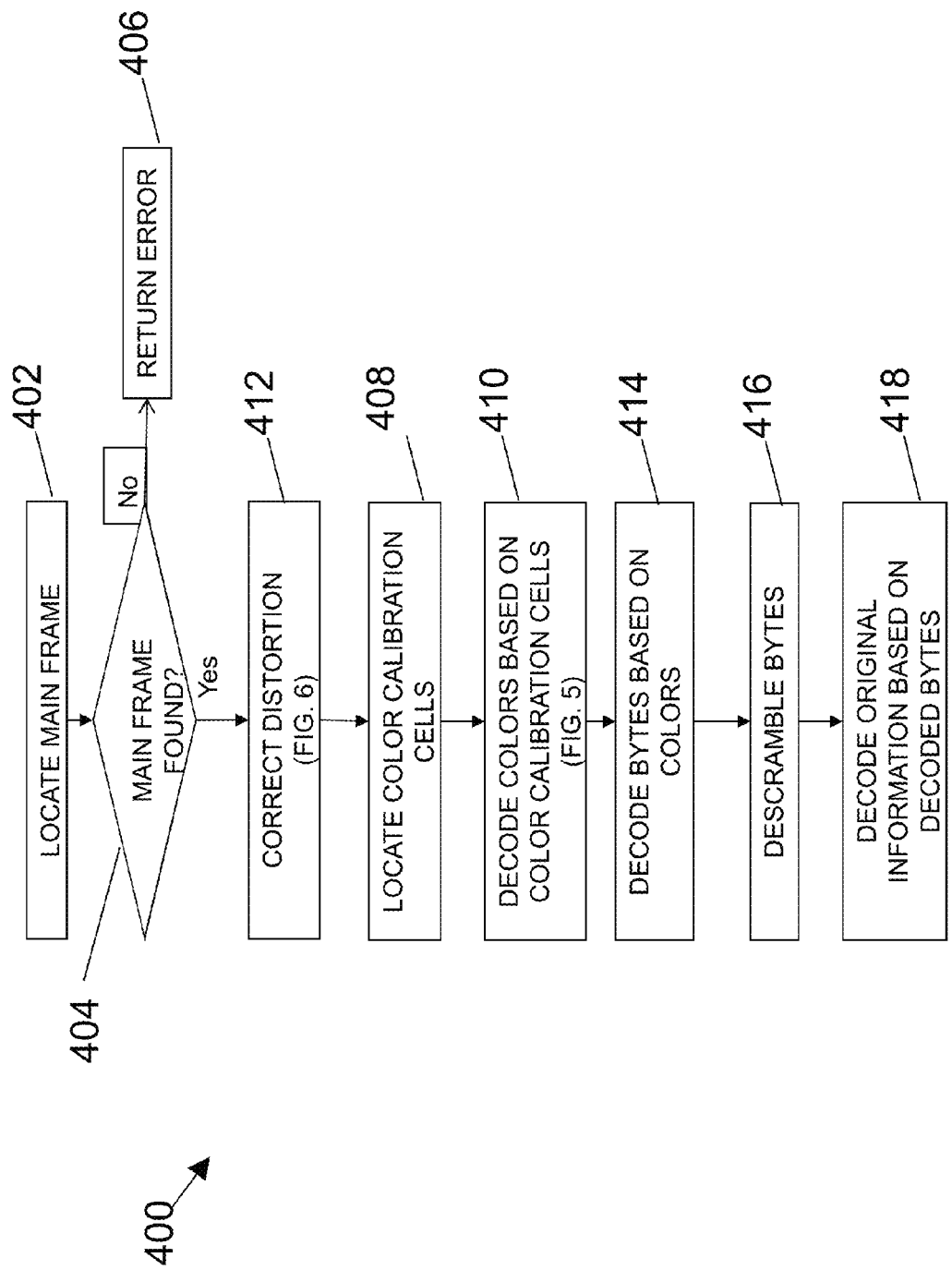
FIG. 4 illustrates a method that the system performs for decoding an image in accordance with certain embodiments of the present disclosure.

FIG. 4 illustrates a method 400 that the system performs for decoding an image in accordance with certain embodiments of the present disclosure.

Once an encoded image is registered, the present system can copy a registered image to any processing device containing a decoding module. An example processing device can include a computer, containing a decoding module with computer-readable instructions for decoding, where the computer-readable instructions are stored on a non-transitory computer storage medium, or containing hardware having hard-coded or embedded decoding instructions stored thereon.

Generally, decoding method 400 includes two high-level processes: (1) image recognition, and (2) two-stage Reed-Solomon decoding. In some embodiments, the present system uses Viterbi decoding as a Reed-Solomon decoder.

The present system locates the main frame (step 402). For example, the present system can locate the black frame and the white frame vertices. The present system can further determine the middles of the corresponding edges of the black frame and the white frame. If the main frame is not found (step 404: No), the present system returns an error (step 406). For example, the error can be that the image cannot be decoded, or the error can be more specific such as that the main frame cannot be found.

If the main frame is found (step 404: Yes), the present system corrects geometric distortion based on the main frame and the zebra frame (step 412). Geometric distortion can occur when a user uses a camera lens, for example on a smartphone or tablet camera, or on a digital camera, to decode an image. Accounting for distortion is described in further detail later, in connection with FIG. 6.

The present system locates the color calibration cells (step 408). As described earlier in connection with FIGS. 2A-2B, in some embodiments, the color calibration cells are located inside the black frame and the white frame, on the left of the rectangular cells encoding the machine data. In other embodiments, the color frame could be located outside the black frame, between the black and white frames, or in other locations within the white frame.

Based on the color frame, the present system decodes the colors in the rectangular cells (step 410). In general, for every pixel found in the encoded image, the present system finds the closest sample pixel based on the color calibration cells and substitutes the sample pixel for the detected pixel. In some embodiments, the present system obtains a color-value correspondence. The present system determines cell size calibration based on the zebra frame. The present system divides the data image into color cells. When decoding the image, the present system captures or collects all colors belonging to a given pixel rectangle. If most of the pixel colors in the pixel rectangle could be recognized as one color from the color calibration cells, that color from the color calibration cells is used. Otherwise, the present system marks the pixel as an erasure. If a pixel-level block cannot be decoded, the present system treats the whole pixel block as an erasure. The present system reads the rectangular cells sequentially and determines an index of the nearest color from the color calibration cells to the median cell color. In particular, the present system determines the nearest color according to nearest Euclidean distance in the appropriate color space, according to Equation (1), described earlier.

The present system decodes the bytes (step 414). In some embodiments, the present system applies a corresponding decoder to the error-correcting encoder described earlier. For example, the present system applies a low-level Reed-Solomon decoder to the code stream obtained from the decoded colors. Accordingly, due to the nature of the error-correcting code, the present system is able to restore erasures and errors in the code stream. If the present system detects unrepairable blocks, the unrepairable blocks are marked as "erasures."

The present system then descrambles the bytes (step 416). In some embodiments, the present system de-interleaves the resulting byte stream.

The present system then decodes the original information based on the decoded byte stream (step 418). In general, the present system uses a corresponding decoder to the error-correcting encoder described earlier, to restore pixel-block-level erasures and errors. In some embodiments, the present system applies a high-level Reed-Solomon decoder. After applying the high-level Reed-Solomon decoder, if some pixel blocks remain un-repairable, the present system attempts to change the indices to those indices corresponding to the next nearest color in the color calibration cells, and then repeats Reed-Solomon decoding of the modified block. If error free data is obtained, the present system maps the resulting sequence of integers to a bit stream. The present system then parses the resulting bit stream and computes a cyclic redundancy check (CRC) of the data. The present system compares the resulting CRC with the CRC contained in the header of the image. The present system then saves or appends the file.

Two-Level COLOR Error Correction Schema with Erasures and Statistical Color Restoration The two-level error correction used in the present system and described earlier in connection with FIGS. 3 and 4 allows the present system to correct two types of errors: errors and erasures. In some embodiments, the Reed-Solomon error-correction encoding used is able to detect errors (which correspond to wrong, incorrect, or unexpected information) and erasures (which correspond to absent or missing information).

In some embodiments, correcting erasures can be performed twice as effectively than correcting errors. To make use of this feature, the present system uses a two-level error correction schema.

For example, assume $N_c=16$ (i.e., $2^4$). Accordingly, there are sixteen distinctive colors which allow an encoded image to encode 4 bits of information per rectangular cell. Every byte of information (8 bits) is encoded by two color indices. The error correction scheme has two levels. First, the byte array is divided into chunks, and every chunk is appended with Reed-Solomon source control data. Second, every byte is divided into two half-bytes (4 bits). The half-bytes are then gathered into groups or chunks which are appended with Reed-Solomon source control data. For example, the present system can process $<N_c-1$ half-bytes. That is, if $N_c=16$, the present system gathers less than fifteen half-bytes. The group of half-bytes is then appended with Reed-Solomon source control data determined based on the group of half-bytes. Because the Reed-Solomon source control data can be about the same size as the input data, the addition of the Reed-Solomon source control data results in the size of the group reaching fifteen bytes. For example, the size of the input data and the control data block size can be fifteen bytes. Each half-byte in the group is mapped to an appropriate color, for example by using the corresponding half-bytes as indices into the color array. Accordingly, the encoding process applies two levels of Reed-Solomon encoding, first at the byte array level and second at the half-byte level.

As described earlier, when decoding the image, the present system collects all colors belonging to a detected pixel rectangle. If most of the colors in the pixel rectangle could be recognized as one of the colors in the color calibration cells, the present system uses the corresponding color in the color calibration cells. Otherwise, the pixel rectangle is marked as an erasure. If a pixel-level block cannot be decoded, the whole pixel block is treated as an erasure. As described earlier, the erasures can be further restored by an appropriate error-correction algorithm. The two-level error correction and leveraging of erasure determinations significantly improves the quality of the decoding described earlier in connection with FIG. 4. In particular, the two-level error correction described herein allows the present system to recover information which otherwise would be lost.

Restoration of Proper Color in the Case of Distinguishable Color Samples

Figure 5:
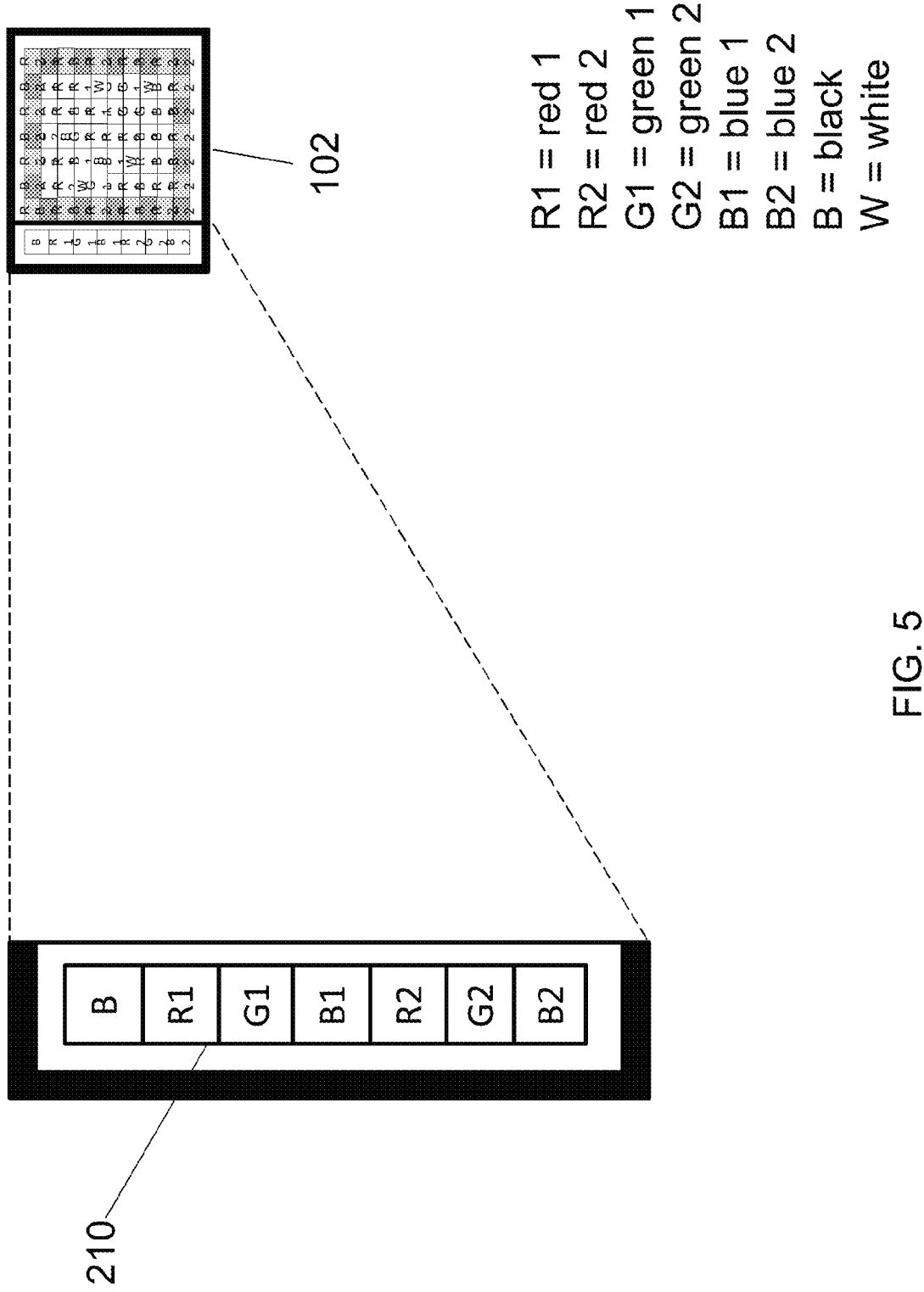
FIG. 5 illustrates a block diagram of color calibration cells for restoration of proper color based on distinguishable color samples in accordance with certain embodiments of the present disclosure.

FIG. 5 illustrates a block diagram of color calibration cells for restoration of proper color based on distinguishable color samples in accordance with certain embodiments of the present disclosure. FIG. 5 includes color calibration cells 210.

Color calibration cells 210 include all colors used to encode the rectangular cells. In some embodiments, a white frame or border surrounds color calibration cells 210 for the color white. In other embodiments, the present system may also include white as a color block in the color calibration cells arranged on the left hand side. The present system discerns each color based on its placement within color calibration cells 210. The present system then stores distorted pixels as color samples. Different variants of a distorted pixel are saved to point or refer to the same correct pixel. That is, distorted pixels are determined dynamically, based on the position of their colors among the color calibration cells. The distorted pixels are assigned estimated colors according to the color calibration cells.

As described earlier, during decoding (shown in FIG. 4), the present system translates a distorted pixel into one of the original colors in color calibration cells 210 using the nearest original color to the distorted pixel. For example, let color $C=(R, G, B)$ represent a red green blue (RGB) component representation of the color. According to Equation (1), described earlier, a pseudo-Euclidean distance between two colors $C_1$ and $C_2$ can be given by $\Delta C$, as described in Equation (1):

$$\Delta C = \sqrt{\left(2 + \frac{\bar{r}}{256}\right)\Delta R^2 + 4\Delta G^2 + \left(2 + \frac{255-\bar{r}}{256}\right)\Delta B^2}$$

This distance generates a native pseudo-Euclidean metric in the color space. A color mapping can be represented by the set of pairs: (distorted color)-->(correct color). The distorted color can be $C_1$, and the correct color can be $C_2$. The number of such color pairs should be greater than or equal to $N_c$, the total number of colors. This mapping can be determined based on the color calibration cells and on the color arrangement therein.

To restore a correct or proper color c* from a distorted color, the present system iterates over all pairs of distorted colors and correct colors. In particular, the present system selects the pair in which the distorted color portion of the pair is closest to the correct or proper color c*. In some embodiments, the determination of whether the distorted color portion is closest to the correct or proper color is made according to the pseudo-Euclidian metrics in the RGB color space. That is, the present system selects the pair in which $\Delta C$ is smallest according to Equation (1). The selected pair provides the correct color. Accordingly, the present system allows the correct colors to be restored, because the present system saves the correspondence between the distorted values and the original values. Therefore, the present system is able to leverage information about the way in which the colors were distorted relative to the original values as captured in the color calibration cells.

Frame Arrangement for Automatic Image Geometrical Distortion Correction

Figure 6:
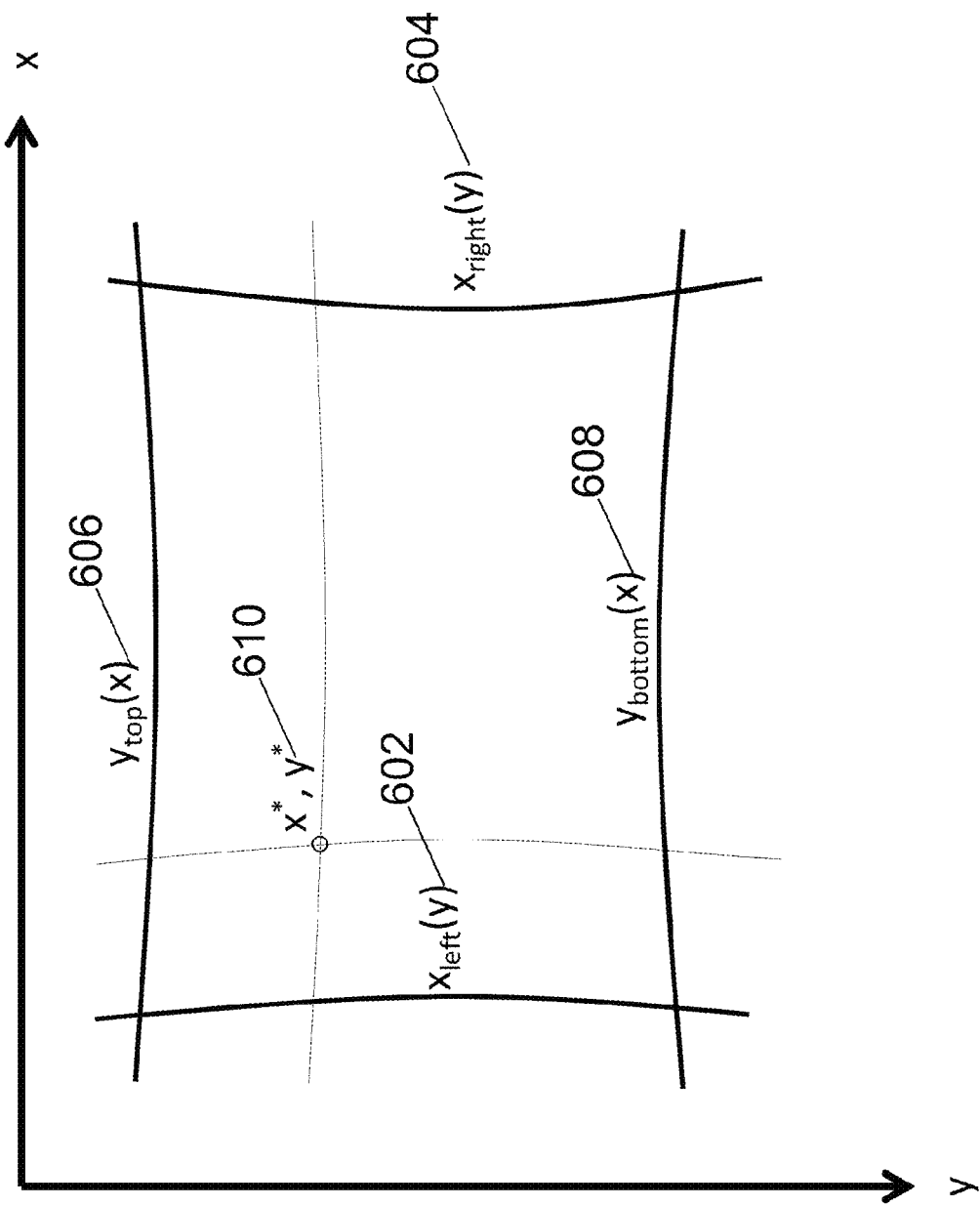
FIG. 6 illustrates a block diagram of a frame arrangement for geometrical distortion correction of an encoded image in accordance with certain embodiments of the present disclosure.

FIG. 6 illustrates a block diagram of a frame arrangement for geometrical distortion correction of an encoded image in accordance with certain embodiments of the present disclosure.

In some embodiments, the present system includes arrangements to recognize placement of rectangular cells and other elements in the encoded image. For example, these arrangements can include black frame 204, white frame 206, zebra frame 208, and color calibration sidebar 210 (shown in FIG. 2). The black frame and white frame surround the encoded rectangular cells. The color calibration sidebar contains sample colors (described earlier, in connection with FIG. 5). The zebra frame surrounds the encoded rectangular cells to allow the present system to determine appropriate resolution and pixel division of the encoded image.

The black frame and white frame allow the present system to determine and correct nonlinear distortion. As described earlier, nonlinear distortion can be introduced, for example, by camera lenses when registering an encoded image for decoding. In some embodiments, the present system uses the white frame as follows. The white frame can be restricted by curve $x_{left}(y)$ 602, curve $x_{right}(y)$ 604, curve $y_{top}(x)$ 606, and curve $y_{bottom}(x)$ 608. For every point (x*,y*) 610 which belongs to the area restricted by curves 602-608, the present system can determine parameters a and b ($0 \leq a \leq 1$ and $0 \leq b \leq 1$) according to the following equations:

$$x_{left}(y^*) + ax_{right}(y^*) = x^* \quad (1\text{-a})$$

$$y_{top}(x^*) + by_{bottom}(x^*) = y^* \quad (1\text{-b})$$

The equation described above maps the area restricted by curves 602-608 to a unit rectangle defined by $0 \leq a \leq 1$, $0 \leq b \leq 1$. The unit rectangle can represent what the image would look like when "straightened out," by mapping the area restricted by curves 602-608 to the unit rectangle. That is, the distorted boundary of the image determined according to the area restricted by curves 602-608 can be mapped to the "straightened out" unit rectangle. The zebra frame can be used to determine parameters a and b. The present distortion correction therefore allows the original area having curved or nonlinear sub-regions to be transformed according to the unit rectangle using parameters a and b.

The zebra frame allows the present system to determine a resolution of the embedded picture, and to divide the image into "bold" or unknown pixels. As described earlier, the color value of some pixels may be unknown. "Bold" pixels allow the present system to determine the proper color value of a pixel according to a voting process. In some embodiments, the voting process can choose the color value of the most frequent pixel close to the "bold" or unknown pixel to be the color value of the "bold" pixel. Otherwise, if the result of the voting is unclear—for example, if there is no pixel with a frequency much larger than the other pixels—the present system can mark the pixel as an erasure (i.e., missing). Therefore, using the two-level error correction described earlier, the pixel can be restored.

Image Fragmentation

Figure 7:
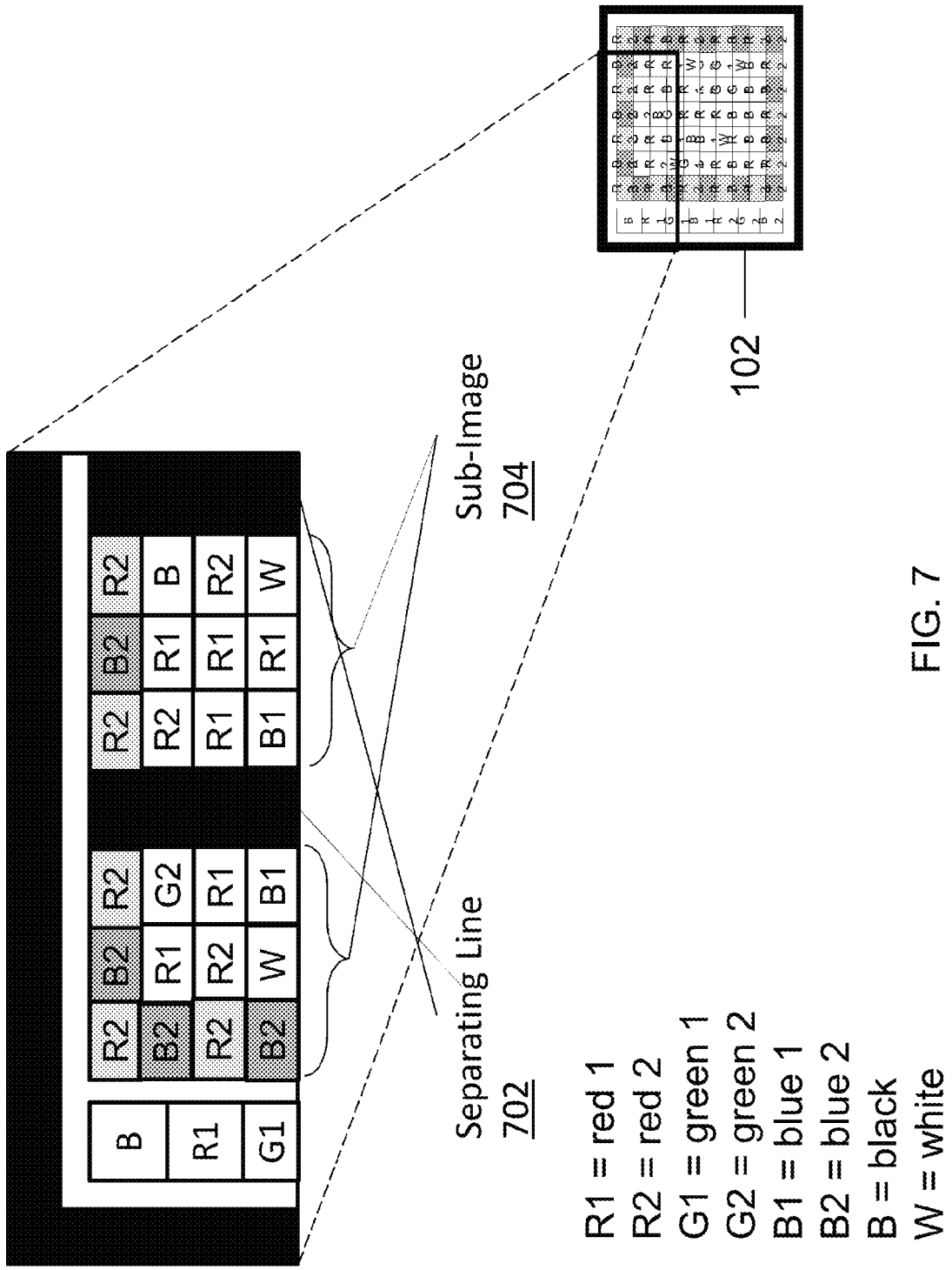
FIG. 7 illustrates a block diagram for frame fragmentation for distortion correction in accordance with certain embodiments of the present disclosure.

FIG. 7 illustrates a block diagram for frame fragmentation for distortion correction in accordance with certain embodiments of the present disclosure. The rectangular cells can be divided into sub-images 704 using separating lines 702.

Frame fragmentation or image fragmentation refers to a complementary technique to distortion correction (shown in FIG. 6). In some embodiments, dividing the image into a set of sub-images 704 allows the present system to work with every sub-image 704, without requiring the distortion compensation technique described earlier because sub-images 704 are sufficiently small that there is not as much distortion as with the entire encoded image. In some embodiments, sub-images 704 can be separated with separating lines 702. In some embodiments, separating lines 702 can be black lines, which can also became part of the zebra border.

The present system can use the same encoding and decoding techniques described earlier (shown in FIGS. 3 and 4) for encoding and decoding of sub-images 704. For example, the present system can leverage the two-level error correction, scrambler, etc. described earlier.

In some embodiments, the present system can skip the distortion correction described earlier (shown in FIG. 6). The present system can leverage the relatively smaller size of sub-images 704 to skip non-linear distortion compensation of each sub-image 704. Accordingly, the present system can decode sub-images 704 with better accuracy.

"Book on Page" and Storage of Massive Data

In some embodiments, the present encoded images can be applied to storing text and images of an entire book on a single piece of paper (or other medium). In other embodiments, the present encoded images can be applied to storing text and images onto a small number of pages of paper (or other medium).

Advantages of embodiments of the present disclosure include: reliable backup for e-books and other content, and faster and easier downloading of an e-book onto a reading device. In some embodiments, the downloading can be performed without requiring network connectivity such as cellular network usage or wireless network usage. Related costs can therefore be much more acceptable and lower to users.

Figure 8:
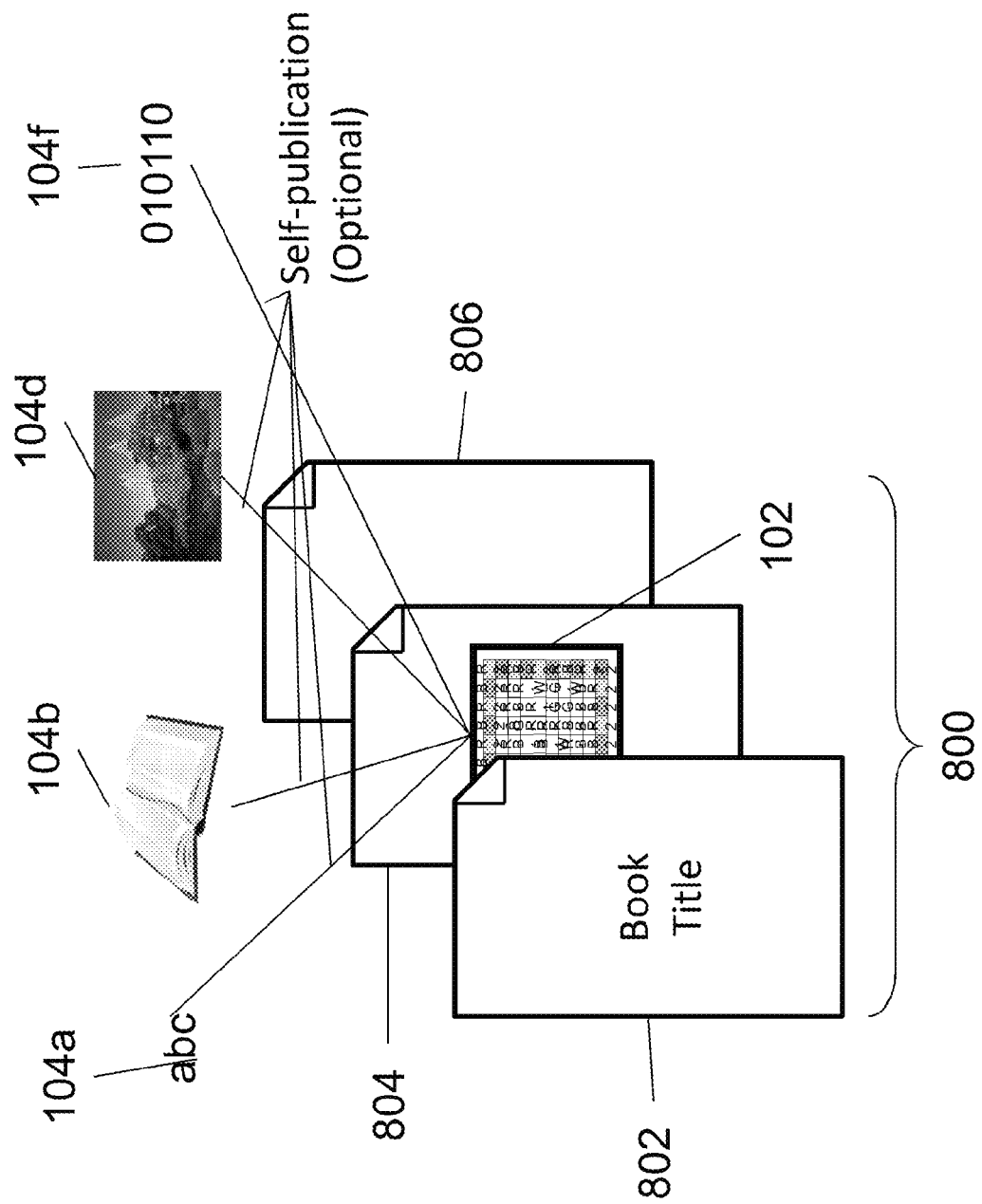
FIG. 8 illustrates a book as an encoded image on a page in accordance with certain embodiments of the present disclosure.

FIG. 8 illustrates a book 800 as an encoded image on a page in accordance with certain embodiments of the present disclosure. Book 800 includes a front cover 802, a middle page 804, and a back cover 806. Embodiments of the present disclosure therefore include digital content of an entire book 104b, encoded into a 2D color space image 102, and printed on media. Non-limiting examples of media for distribution can include paper, plastic, textiles, fabrics, and the like. Non-limiting examples of digital content that can be included in book 800 include book 104b, text 104a, photo 104d (or other images or artwork), and any other binary data 104f. In some embodiments, book 800 can include only middle page 804 with encoded image 102, without front cover 802 or back cover 806. Due to the color space encoding used by the present system, the amount of media needed can be substantially lower than used in traditional printing. In other embodiments, book 800 includes more than one middle page 804 with encoded images.

Several options can be used to decode book 800 printed as described herein, to bring book 104b from encoded image 102 to an e-reader or other compatible device.

First, book 800 including encoded image 102 can be registered or captured by an appropriate device having an appropriate camera lens, such as a digital camera, smartphone camera, or tablet camera.

In some embodiments, encoded image 102 in book 800 can be scanned by a traditional scanner to a personal computer (PC). As described earlier, appropriate hardware or software on the PC can decode encoded image 102 according to the decoding process described in connection with FIG. 4. After the content has been decoded, the encoded content such as book 104b can be transferred to an e-reader, as with any other content.

Second, book 800 including encoded image 102 can be photographed, for example using a digital camera having a memory card for storing digital images. The memory card from the digital camera can be placed in a compatible e-reader (e.g., an e-reader with a memory slot) or in a conventional PC having a compatible card slot. A software application or particularized hardware can decode encoded image 102 directly on the e-reader or directly on the PC.

Third, book 800 including encoded image 102 can be photographed by an embedded camera in a compatible reading device. Non-limiting examples of compatible reading devices include any smartphone or tablet with an embedded camera. Once photographed, encoded image 102 can be decoded in hardware or using an appropriate software application on the reading device. In some embodiments, the reading device can include a tablet, a PDA, a notebook computer, a PC, a smartphone, a palmtop or handheld device, or the like.

Supported Resolution

Examples of supported or appropriate resolutions for a device for registering or capturing encoded image 102 in book 800 are described in the following examples.

Many printers can print with a resolution of about 300 dots per inch (dpi). Accordingly, some supported resolutions can be given if a scanner is set to 600 dpi or higher. Selecting a resolution of 600 dpi or higher from a scanning device assures that printed pixels of encoded image 102, printed at 300 dpi, can be scanned and therefore registered or captured.

On a typical page of A4-size or letter-size paper, a usable area can be about eight inches by about ten or eleven inches (8"×10" or 8"×11"). At 300 dots per inch and a usable area of about 8"×10" or 8"×11", approximately 3300×2400 pixels (300 dpi×11 in. by 300 dpi×8 in.) can be printed on an appropriate page. In some embodiments, due the properties of the encoding algorithm explained earlier, a "real" data pixel as encoded and decoded using the present systems and methods can consist of about 3×3 printed pixels. Three pixels can be used for one "real" data pixel because one printed pixel may otherwise be too small to decode a proper color value. For example, printers or scanners may be of relatively lower quality, and printed pixels may not match pixels detected via a camera or scanner. Using "bold" pixels including about 3×3 printed pixels can assist with determining an average color value for voting. Accordingly, the decoding process described can be more accurate by determining original colors, albeit at the expense of some printed resolution. In some embodiments, to implement error detection and correction, the present system and methods can add 100% overhead (as explained) and use sixteen colors to build an appropriate color space encoding. Accordingly, the amount of data that can be encoded into an encoded image 102 able to fit on a usable area of a page is about 220 kilobytes (kB).

The content (i.e., text and/or images) of a typical book 102b can be represented by a similar number of bits. For example, for a book of about 200 pages, there can be about 1000-1100 characters on each page. For example, *The Hound of the Baskervilles* by Sir Arthur Conan Doyle is about 150 kB in ePub format. In some embodiments, for longer books (e.g., War and Peace by Leo Tolstoy), multiple pages with multiple encoded images 102 can be used. The space savings and savings in printed materials would still be significant due to the encoding process described earlier.

As described earlier, a single page can have printed on it, in some embodiments, about 3300 pixels×2400 pixels≈7,920,000 pixels. Accordingly, a traditional digital camera with an image sensor of about 8 megapixels (MP) or more has enough resolution to register or capture a picture of encoded image 102 printed on suitable media of about such size.

In some embodiments, if a photo camera is used as a registering or capturing device, the two-level error correction described earlier helps avoid and/or correct decoding errors that can arise especially due to different light conditions encountered during registration or capture, or related to the quality of the paper used or due to properties of the other media.

The numbers and counts above have been presented by way of example only. In some embodiments, as optics, scanners, and cameras become more advanced, higher resolutions can be achieved in both the encoding process (shown in FIG. 3) and the decoding process (shown in FIG. 4) described herein.

For example, in the example presented earlier, the relevant printed pixel size was described to be about 80×80 microns. In theory, good photo lenses can be capable of resolving details to about 10 microns. Accordingly, theoretically more than 60 times better resolution can be achieved. As a result, a single page such as middle page 804 could contain about fifteen megabytes (MB) of information. Fifteen megabytes represents more than enough data capacity to print even the longest and most complex book on a single page.

In some embodiments, the present systems and methods promote green technologies. For example, the book *The Hound of the Baskervilles* by Sir Arthur Conan Doyle is about 220 pages in a paper printed version. In a book printed and encoded as described earlier, i.e. on a middle page with front and back covers, the resulting encoded book uses only three pages. This represents a savings in paper of at least 70 times. Bookstores could generate higher profits and revenue by switching over their stock or portions thereof to encoded books as described herein.

As illustrated in FIG. 8, in some embodiments, the present systems and methods promote low-cost self-publishing. Book 800 as described herein represents a substantial reduction in printed media required to store and distribute a book or any other content. Accordingly, the cost of self-publishing a book can drop dramatically due to savings in materials and media used. With decorated covers and nice printing, book 800 can be highly appreciated on bookshelves as well as gifts.

Figure 9A:
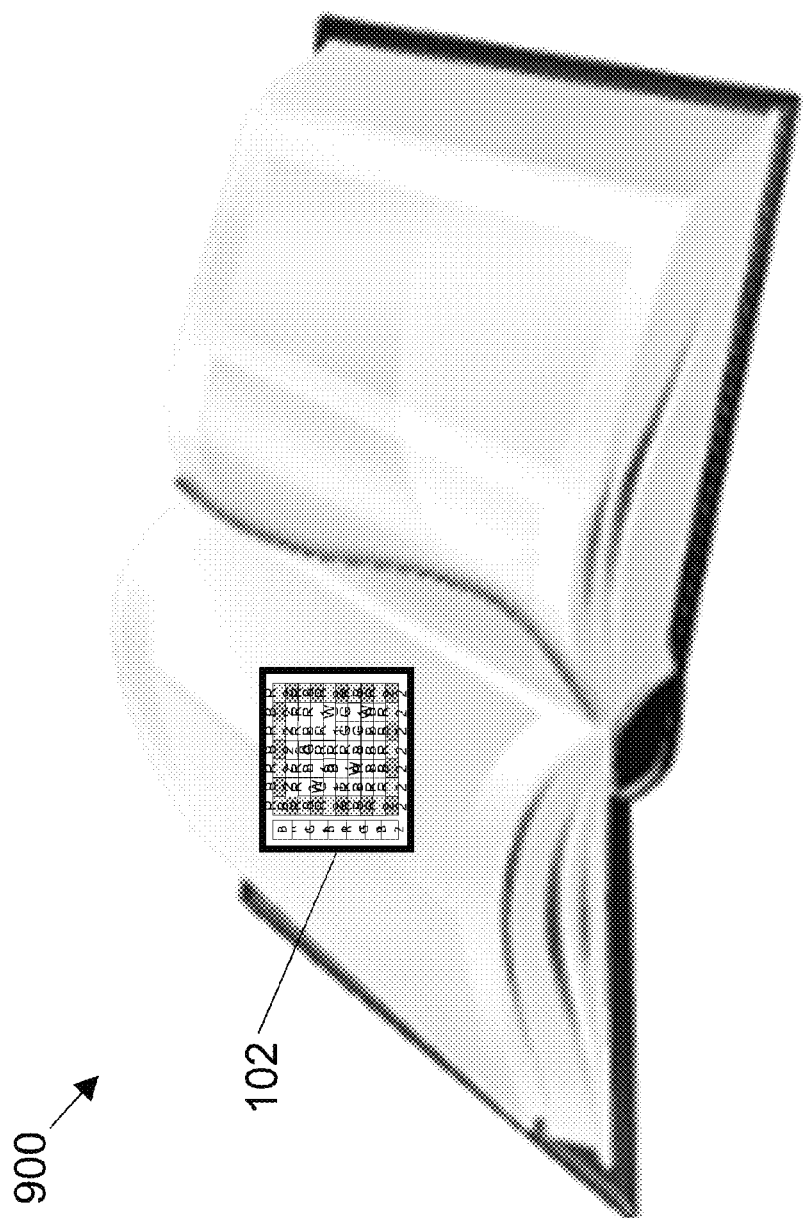
FIG. 9A illustrates an example of a combination book with a digital book using a color space encoded image in accordance with certain embodiments of the present disclosure.

FIG. 9A illustrates an example of a combination book 900 with a digital book using a color space encoded image in accordance with certain embodiments of the present disclosure. FIG. 9A includes combination book 900, and encoded image 102. Combination book 900 can include encoded image 102 in addition to a traditionally printed book. Encoded image 102 can be printed inside combination book 900, for example on a front cover, a back cover, or on any intermediate page (as shown in FIG. 9A). Encoded image 102 having a digital copy of an e-book can be distributed to accompany a traditionally printed book. In some embodiments, encoded image 102 can also be distributed as an attachment or insert to newspapers, magazines, or any other traditionally printed matter.

Figure 9B:
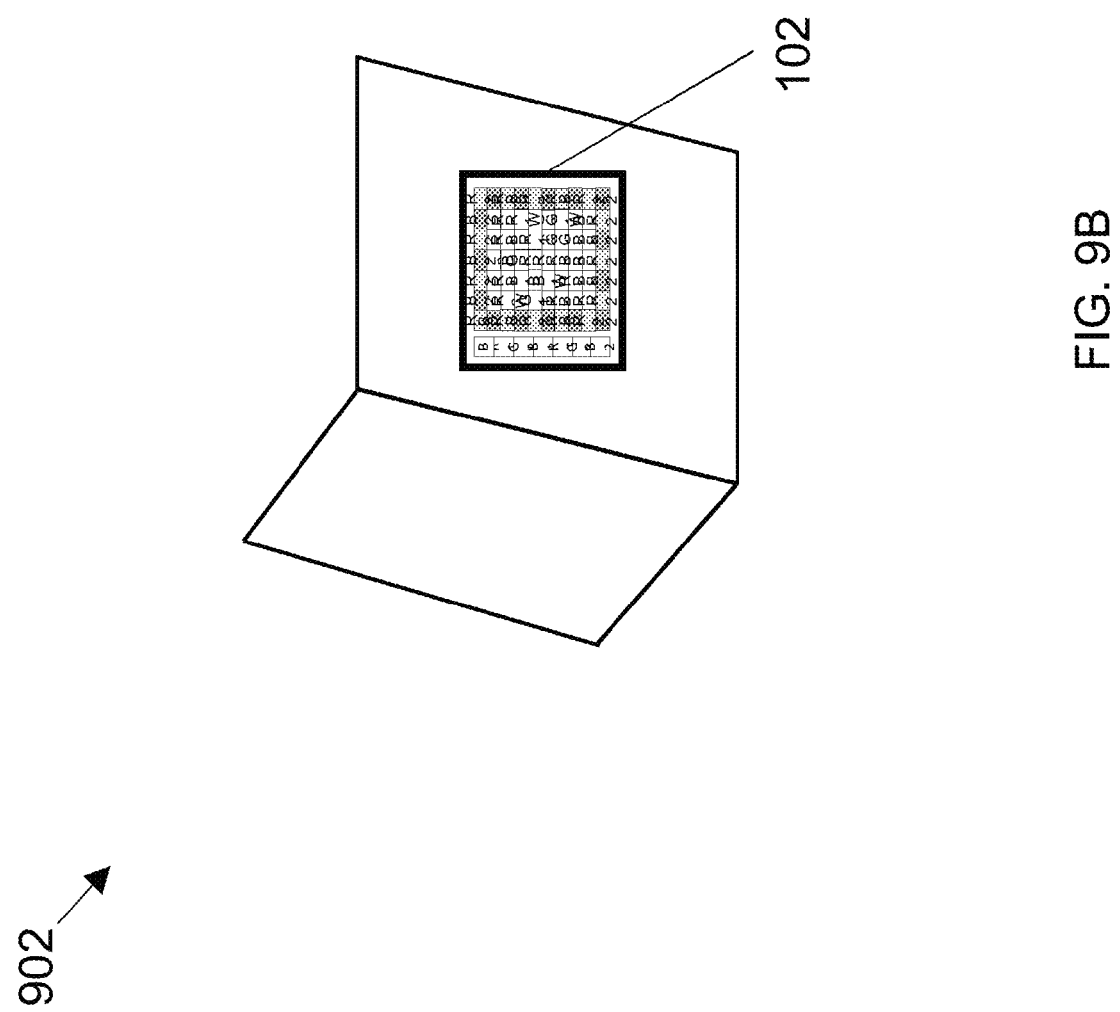
FIG. 9B illustrates an example of a greeting card using a color space encoded image in accordance with certain embodiments of the present disclosure.

FIG. 9B illustrates an example of a greeting card 902 using a color space encoded image in accordance with certain embodiments of the present disclosure. FIG. 9B includes greeting card 902 and encoded image 102. Greeting card 902 can include encoded image 102, in addition to a traditionally printed greeting card. The digitally-encoded greeting card can include colorful text, animation, video, music, voice recordings of friends or family members, or any other binary data encoded in accordance with the encoding process described in FIG. 3.

Figure 10:
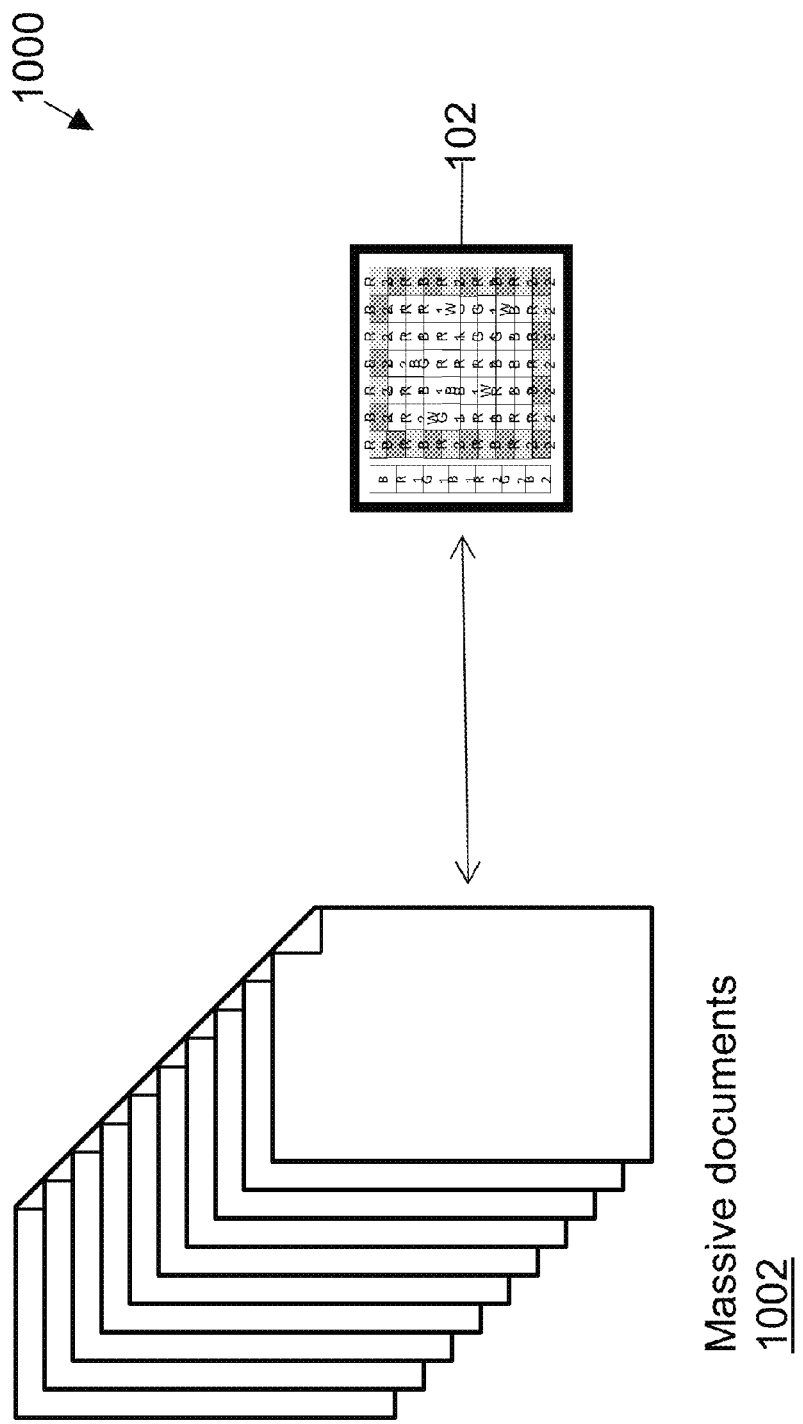
FIG. 10 illustrates a block diagram of an example system for copying large documents using color space encoded images in accordance with certain embodiments of the present disclosure.

FIG. 10 illustrates a block diagram of an example system 1000 for copying large documents using color space encoded images in accordance with certain embodiments of the present disclosure. System 1000 includes large documents 1002 and an encoded image 102. In some embodiments, the present systems and methods allow users to copy large documents 1002 using encoded image 102. For example, large documents 1002 can include technical manuals or other technical documents such as technical standards. Technical standards in particular can be frequently updated and require significant amounts of paper for printing. Certain large documents 1002 also need to be stored safely. Example large documents 1002 can include technical manuals such as manuals for pilots. Advantageously, large documents 1002 can be downloaded easily on devices in which all network connectivity has been disabled for safety reasons, also known as airplane mode on certain devices, so long as the devices have hardware or software modules implementing the decoding process described earlier, in connection with FIG. 4. Large documents 1002 can still be downloaded and shared easily on any device with an embedded camera, without requiring a network to transfer encoded data such as encoded image 102 or decoded data such as the machine content encoded into encoded image 102.

FIG. 11 illustrates a block diagram of an example system 1100 for data backup for e-books and other content using color space encoded images in accordance with certain embodiments of the present invention. System 1100 includes data backup 1102, and encoded image 102. To perform data backup of a desired host system, system 1100 is able to compress machine data into color space encoded images such as encoded image 102. In some embodiments, data backup 1102 can include electronic copies of encoded image 102 and other encoded images. In other embodiments, data backup 1102 can include physical copies such as printouts of encoded image 102. In further embodiments, the printouts can be laminated, protected, or otherwise preserved so that they are able to be decoded and read for significantly longer amounts of time than a typical electronic storage device might be able to store electronic images.

As described earlier, any type of data can be encoded and stored in accordance with the color space encoding systems and methods described herein, and where the encoded images can be printed (or displayed or otherwise output) on proper media.

Figure 12:
FIG. 12 illustrates a block diagram for information visualization using a color space encoded image in accordance with certain embodiments of the present disclosure.

FIG. 12 illustrates a block diagram for information visualization using a color space encoded image 1200 in accordance with certain embodiments of the present disclosure. In some embodiments, the present system allows for visualization of certain information. Because the color space encoded image appears to a human eye like an irregular combination of colored spots, some users might find the encoded images unattractive, or find the encoded images do not provide direct visual information about encoded data or subject matter.

In some embodiments, a specific and subject-related picture can be combined from encoding spots (such as a book's name 1202, etc.). In other embodiments, a picture 1204 can be overlaid on encoded image 1200. In further embodiments, less useful information can be placed or displayed on a frame. The attractiveness and directness of encoded image 1200 can lead the subject of the encoded data to be more interesting or important for a user.

In some embodiments, a similar approach of information visualization by combining a picture with an encoded image can be used for front and/or back covers of books.

Although specific steps are disclosed in FIGS. 3 and 4, such steps are exemplary. That is, the present system is well-suited to performing various other steps or variations of the steps recited in FIGS. 3 and 4. The steps in FIGS. 3 and 4 may be performed in an order different than presented, and that not all of the steps may be performed. FIGS. 3 and 4 include processes that, in various embodiments, are carried out by a processor under the control of computer-readable and computer-executable instructions. Embodiments of the present disclosure may thus be stored as non-transitory computer-readable media or computer-executable instructions including, but not limited to, firmware updates, software update packages, or hardware (e.g., ROM).

Reference has been made in detail to various embodiments in accordance with the present disclosure, examples of which are illustrated in the accompanying drawings. While the invention has been described in conjunction with various embodiments, these various embodiments are not intended to limit the invention. On the contrary, the invention is intended to cover alternatives, modifications, and equivalents, which may be included within the scope of the invention as construed according to the appended claims. Furthermore, in the detailed description of various embodiments, numerous specific details have been set forth in order to provide a thorough understanding of the invention. However, the invention may be practiced without these specific details. In other instances, well known methods, procedures, components, and circuits have not been described in detail, so as not to unnecessarily obscure aspects of the invention.

Some portions of the detailed descriptions have been presented in terms of procedures, logic blocks, processing, and other symbolic representations of operations on data bits within a non-transitory computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of operations or steps or instructions leading to a desired result. The operations or steps are those utilizing physical manipulations and transformations of physical quantities. Usually, although not necessarily, these quantities take the form of electrical or magnetic signals capable of being stored, transferred, combined, compared, and otherwise manipulated in a computer system or computing device. It has been convenient at times, principally for reasons of common usage, to refer to these signals as records, transactions, bits, values, elements, symbols, characters, samples, pixels, or the like.

All of these and similar terms are to be associated with the appropriate physical quantities and are merely convenient labels applied to these quantities. Unless specifically stated otherwise as apparent from the foregoing discussions, it is appreciated that throughout the present disclosure, discussions utilizing terms such as "deactivating," "disabling," "re-activating," "enabling," "sending," "receiving," "determining," "flushing," "responding," "generating," "making," "blocking," "accessing," "taking a snapshot," "associating," "allowing," "updating," or the like, refer to actions and processes of a computer system or similar electronic computing device or processor. The computer system or similar electronic computing device manipulates and transforms data represented as physical (electronic) quantities within the system memories, registers or other such information storage, transmission or display devices.

The present systems and methods can be implemented in a variety of architectures and configurations. For example, the present systems and methods can be implemented as part of a distributed computing environment, a cloud computing environment, a client server environment, etc. The embodiments described herein may be discussed in the general context of computer-executable instructions residing on some form of non-transitory computer-readable storage medium, such as program modules, executed by one or more computers, computing devices, or other devices. As described earlier, non-limiting examples of computer-readable storage media may include storage media and communication media. Generally, program modules include routines, programs, objects, components, data structures, etc., that perform particular tasks or implement particular abstract data types. The functionality of the program modules may be combined or distributed as desired in various embodiments.

The foregoing descriptions of specific embodiments of the present systems and methods have been presented for purposes of illustration and description. The specific embodiments are not intended to be exhaustive or to limit the invention to the precise forms disclosed, and many modifications and variations are possible in light of the above description. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer-implemented method for encoding documents, the method comprising:
   receiving, at an encoding device, one or more documents;
   creating, at the encoding device, colored cells within a color space to provide an encoded representation of the received one or more documents in an image by processing the received documents to obtain a stream of integers, each integer in the stream of integers corresponding to a color in the color space for a cell in the image; and
   creating, at the encoding device, one or more additional cells adjoining the image, including color calibration cells, the one or more additional cells created to correct color distortion in the encoded image by determining a pseudo-Euclidean metric in the color space, the metric measuring a distance including a measure of an average of: (a) a red component in the colored cells and (b) a red component in the color calibration cells.

2. The method of claim 1, further comprising printing the image onto a medium.

3. The method of claim 2, wherein the medium includes at least one of paper, plastic, textiles, and fabrics.

4. The method of claim 1, further comprising storing the image electronically.

5. The method of claim 1, wherein the document includes a plurality of pages of content.

6. A system for encoding documents, the system comprising:
   memory;
   storage;
   at least one processor configured to use the memory and the storage to:
      receive one or more documents;
      create colored cells within a color space to provide an encoded representation of the received one or more documents in an image by processing the received documents to obtain a stream of integers, each integer in the stream of integers corresponding to a color in the color space for a cell in the image; and
      create one or more additional cells, including color calibration cells, adjoining the image, the one or more additional cells created to correcting color distortion in the encoded image by determining a pseudo-Euclidean metric in the color space, the metric measuring a distance including a measure of an average of: (a) a red component in the colored cells and (b) a red component in the color calibration cells.

7. The system of claim 6, wherein the at least one processor is further configured to print the image onto a medium.

8. The system of claim 7, wherein the medium includes at least one of paper, plastic, textiles, and fabrics.

9. The system of claim 6, wherein the at least one processor is further configured to store the image electronically.

10. The system of claim 6, wherein the document includes a plurality of pages of content.

11. A non-transitory computer program product for encoding documents, the non-transitory computer program product tangibly embodied in a computer-readable medium, the non-transitory computer program product including instructions operable to cause a data processing apparatus to:
receive one or more documents;
create colored cells within a color space to provide an encoded representation of the received one or more documents in an image by processing the received documents to obtain a stream of integers, each integer in the stream of integers corresponding to a color in the color space for a cell in the image; and
create one or more additional cells, including color calibration cells, adjoining the image, the one or more additional cells created to correct color distortion in the encoded image by determining a pseudo-Euclidean metric in the color space, the metric measuring a distance including a measure of an average of: (a) a red component in the colored cells and (b) a red component in the color calibration cells.

12. The non-transitory computer program product of claim 11, wherein the instructions are operable to further cause the data processing apparatus to print the image onto a medium.

13. The non-transitory computer program product of claim 12, wherein the medium includes at least one of paper, plastic, textiles, and fabrics.

14. The non-transitory computer program product of claim 11, wherein the instructions are operable to further cause the data processing apparatus to store the image electronically.

15. The non-transitory computer program product of claim 11, wherein the document includes a plurality of pages of content.

16. The method of claim 1, wherein the pseudo-Euclidean metric is defined as:

$$\Delta C = \sqrt{\left(X + \frac{\bar{r}}{256}\right)\Delta R^2 + Y\Delta G^2 + \left(Z + \frac{255 - \bar{r}}{256}\right)\Delta B^2}$$

wherein:
$\Delta C$ is a pseudo-Euclidean distance between two colors,
$C_1$ includes a red component $R_1$, a green component $G_1$, and a blue component $B_1$,
$C_2$ includes a red component $R_2$, a green component $G_2$, and a blue component $B_2$,
X, Y and Z represent coefficients, $\Delta R = R_2 - R_1$, $\Delta G = G_2 - G_1$, $\Delta B = B_2 - B_1$, and $$\bar{r} = \frac{R_1 + R_2}{2}.$$

17. The method of claim 16, wherein the coefficients of the pseudo-Euclidean metric are defined as X=2, Y=4 and Z=2.

18. The system of claim 6, wherein the pseudo-Euclidean metric is defined as:

$$\Delta C = \sqrt{\left(X + \frac{\bar{r}}{256}\right)\Delta R^2 + Y\Delta G^2 + \left(Z + \frac{255 - \bar{r}}{256}\right)\Delta B^2}$$

wherein:
$\Delta C$ is a pseudo-Euclidean distance between two colors,
$C_1$ includes a red component $R_1$, a green component $G_1$, and a blue component $B_1$,
$C_2$ includes a red component $R_2$, a green component $G_2$, and a blue component $B_2$,
X, Y and Z represent coefficients, $\Delta R = R_2 - R_1$, $\Delta G = G_2 - G_1$, $\Delta B = B_2 - B_1$, and $$\bar{r} = \frac{R_1 + R_2}{2}.$$

19. The system of claim 18, wherein the coefficients of the pseudo-Euclidean metric are defined as X=2, Y=4 and Z=2.

20. The non-transitory computer program product of claim 11, wherein the pseudo-Euclidean metric is defined as:

$$\Delta C = \sqrt{\left(X + \frac{\bar{r}}{256}\right)\Delta R^2 + Y\Delta G^2 + \left(Z + \frac{255 - \bar{r}}{256}\right)\Delta B^2}$$

wherein:
$\Delta C$ is a pseudo-Euclidean distance between two colors,
$C_1$ includes a red component $R_1$, a green component $G_1$, and a blue component $B_1$,
$C_2$ includes a red component $R_2$, a green component $G_2$, and a blue component $B_2$,
X, Y and Z represent coefficients, $\Delta R = R_2 - R_1$, $\Delta G = G_2 - G_1$, $\Delta B = B_2 - B_1$, and $$\bar{r} = \frac{R_1 + R_2}{2}.$$

21. The non-transitory computer program product of claim 20, wherein the coefficients of the pseudo-Euclidean metric are defined as X=2, Y=4 and Z=2.

* * * * *